United States Patent [19]

Chou et al.

[11] 3,898,814

[45] Aug. 12, 1975

[54] MECHANISM FOR CLAMPING AND DRIVING A FLEXIBLE DISC

[75] Inventors: Albert S. Chou, Monte Sereno; Yang Hu Tong, San Jose; Harold C. Medley, Los Gatos; Warren L. Dalziel, Monte Sereno, all of Calif.

[73] Assignee: Shugart Associates, Sunnyvale, Calif.

[22] Filed: May 13, 1974

[21] Appl. No.: 469,411

[52] U.S. Cl. .......................... 64/22; 74/206; 274/9 B

[51] Int. Cl.$^2$ .................... G11B 25/04; F16H 13/00

[58] Field of Search ...... 360/97, 106; 274/9 B, 10.5, 274/2; 74/206, 209; 64/15 R, 22, 22.5

[56] References Cited

UNITED STATES PATENTS

| | | | |
|---|---|---|---|
| 2,905,475 | 9/1959 | Cheeseboro | 274/9 B |
| 2,943,861 | 7/1960 | Redfield | 274/9 B |
| 3,165,320 | 1/1965 | Ryan | 274/2 |
| 3,193,295 | 7/1965 | Isemura | 274/9 B |
| 3,561,768 | 2/1971 | Castagna | 274/9 B |
| 3,678,481 | 7/1972 | Dalziel et al. | 360/97 |

FOREIGN PATENTS OR APPLICATIONS

| | | | |
|---|---|---|---|
| 459,595 | 9/1968 | Switzerland | 274/9 B |
| 539,492 | 9/1941 | United Kingdom | 274/9 B |

*Primary Examiner*—Samuel Scott
*Assistant Examiner*—Allan R. Burke
*Attorney, Agent, or Firm*—Schatzel & Hamrick

[57] ABSTRACT

A mechanism for clamping and driving a flexible disc comprising a rotatable spindle, a rotatable annular hub clamp, a lifter and a spring. The hub clamp is axially movable so as to engage the disc and carries a plurality of flexible fingers which serve to engage the inner periphery of the disc, and cam the disc along the spindle into registration with a disc registration surface, thereby centering the disc on the spindle. In the preferred embodiment a drive pin carried by the spindle engages a hub pin of the hub clamp to positively transmit the rotation of the spindle to the hub clamp. In a second embodiment, a flexible collet serves to clamp the disc and the clamping assembly to the spindle.

10 Claims, 6 Drawing Figures

PATENTED AUG 1 2 1975

3,898,814

SHEET 1

PATENTED AUG 12 1975 3,898,814

SHEET 2

MECHANISM FOR CLAMPING AND DRIVING A FLEXIBLE DISC

BACKGROUND OF THE INVENTION

1. Field of the Invention

The present invention relates generally to magnetic recording/playback apparatus and more particularly to an improved flexible disc drive including a mechanism for clamping and driving a flexible disc.

2. Description of the Prior Art

The flexible disc recording medium, sometimes called a floppy disc or discette cartridge, is a Mylar disc enclosed in a plastic envelope having apertures for enabling the disc to be driven. Magnetic material is secured to the faces of the disc so as to provide the recording surfaces. The cartridge drive unit for receiving and making functional use of the cartridge typically consists of a drive mechanism, a read/write head, and means for receiving and loading the cartridge onto the drive mechanism and the read/write head.

In prior art apparatus of this type a door is opened, the cartridge is inserted into a slot between a drive spindle and a clamping structure, and the clamping structure then clamps the cartridge against the drive spindle. However, insertion of the disc does not provide positive cartridge registration and the disc may be damaged if the door is closed with the cartridge slightly misregistered.

Some prior art devices utilize a cartridge guide to direct the cartridge during insertion toward the spindle. In such devices the door is typically fixed to the cartridge guide by means of cams or linkages so that when the door is closed the cartridge is moved into registration with the drive spindle. However, these devices rarely provide for accurate disc-spindle alignment. Because of the misalignment associated with some prior art devices, registration is obtained only as long as the door is slowly closed such that the disc is gradually moved along the spindle and into registration therewith. However, it has been found that when the door is slammed, typically the disc becomes deformed. Consequently, since the cartridges are somewhat fragile and subject to wear and damage from mistreatment, the useful life of a cartridge is less than it could be if accurate alignment was provided.

In addition, it should be noted that when the disc is loaded, the spindle is normally rotating at its prescribed angular velocity, whereas the disc clamping mechanism is normally stationary and must be driven by the spindle. Accordingly, the disc clamping mechanism must be accelerated in order to reach the angular velocity of the spindle. Furthermore, a certain resistance to rotation is associated with the flexible disc due to its inertia and frictional engagement with the walls of the plastic envelope. Consequently, upon starting, the angular velocity of the disc is different from that of the disc clamping mechanism, and the angular velocity of the spindle is different from that of the disc. Because of these differences in angular velocities, the clamp tends to scuff and sometimes to destroy the magnetic surfaces of the flexible disc in the clamping area.

Examples of prior art devices are found in U.S. Pat. No. 3,678,481 issued July 18, 1972, in the name of Warren L. Dalziel, Jay B. Nilson and Donald L. Wartner entitled "Data Storage Apparatus Employing a Single Magnetic Disc," and U.S. Pat. No. 3,609,722 issued Sept. 28, 1971, in the name of George E. Zenzefilis, entitled "Center Sealing Data Disc Cassette and Processing Machine."

SUMMARY OF THE INVENTION

It is therefore a principle object of the present invention to provide a mechanism for clamping and driving a flexible disc which is capable of providing accurate alignment of the disc with the drive spindle and which includes a positive drive between the clamping assembly and the spindle.

Another object of the present invention is to provide a means for urging a flexible disc into registration with the drive spindle without deforming the disc, under all dynamic conditions of clamping.

Briefly, a preferred embodiment of the present invention includes a mechanism for clamping and driving a flexible disc comprising a rotatable spindle, a rotatable annular hub clamp, a lifter and a spring. The hub clamp is axially movable so as to engage the disc and carries a plurality of flexible fingers which serve to engage the inner periphery of the disc, and cam the disc along the spindle into registration with a disc registration surface, thereby centering the disc on the spindle. A drive pin carried by the spindle engages a hub pin of the hub clamp to positively transmit the rotation of the spindle to the hub clamp.

In a second embodiment, the hub clamp includes a flexible collet which serves to clamp the disc and the clamping assembly to the spindle.

One advantage of the present invention is that because of the positive registration between the disc and spindle, disc life is improved.

Another advantage of the present invention is that a direct coupling is provided between the spindle and the clamping assembly to assure that the angular velocity of the the clamping assembly tracks that of the spindle.

Still another advantage of the present invention is that the disc is automatically brought into registration with the spindle independent of the slamming of the door.

Still another advantage of the present invention is that the hub clamp is brought up to the rotational velocity of the spindle before the disc is clamped, thus minimizing disc damage due to scuffing.

Other objects and advantages of the present invention will be apparent to those skilled in the art after having read the following detailed description of the preferred embodiments which is illustrated in the several figures of the drawing.

IN THE DRAWING

DETAILED DESCRIPTION OF THE PREFERRED EMBODIMENTS

Figure 1:
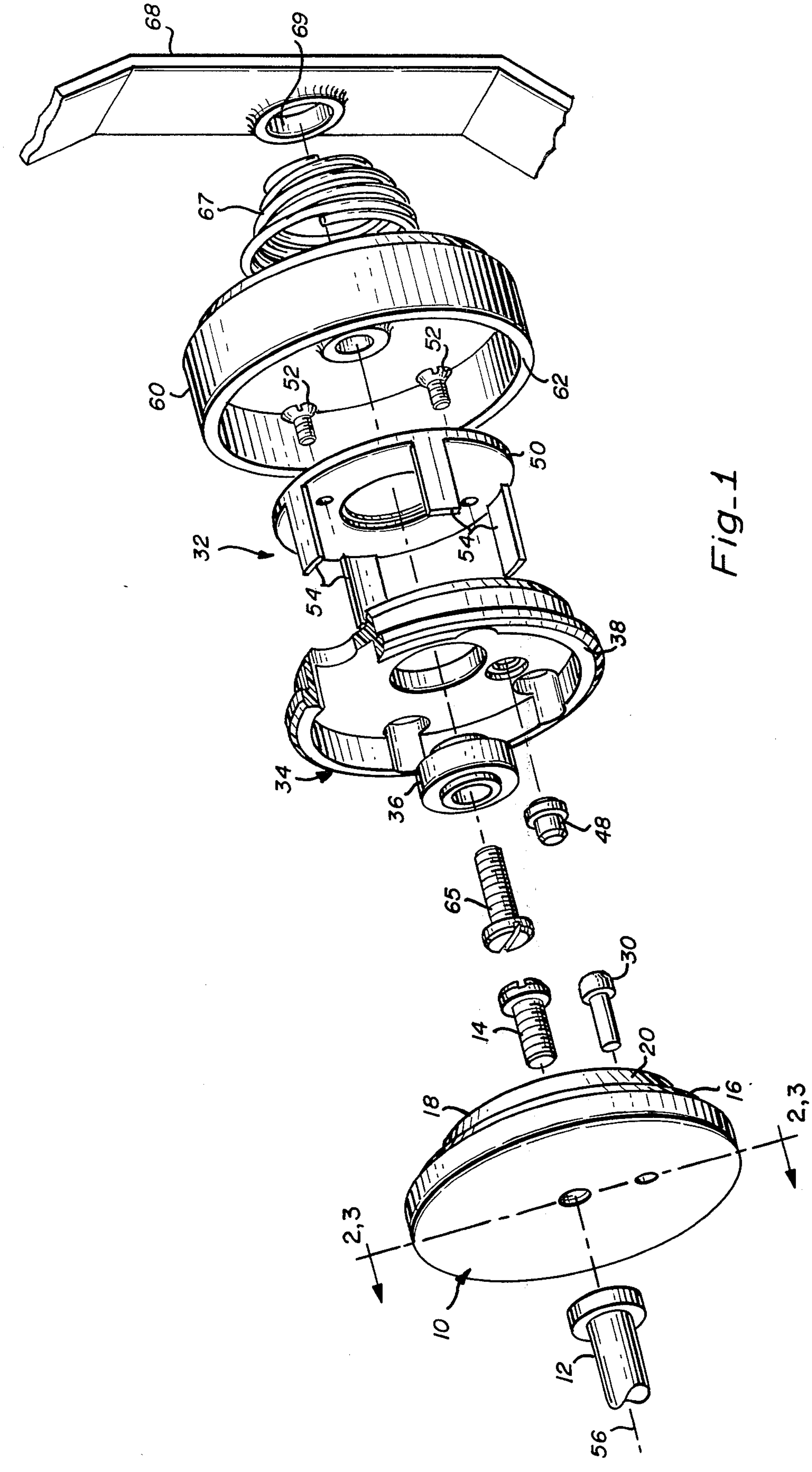
FIG. 1 is an exploded perspective view of the apparatus in accordance with the present invention.

In FIG. 1 of the drawing, a perspective representation of the mechanism for clamping and driving a flexible disc 8 in accordance with the present invention is shown. The disc 8 is enclosed in a plastic envelope, or jacket, 9 so as to form what is commonly referred to as a disc cartridge. The mechanism is of the type that may be included in the flexible disc drive described in copending U.S. Pat. application Ser. No. 378,549 filed July 12, 1973, in the name of Warren L. Dalziel entitled "Flexible Disc Cartridge Ejector System." Accordingly, that application is incorporated by reference to this specification for details of the flexible disc drive apparatus not disclosed herein.

Figure 2:
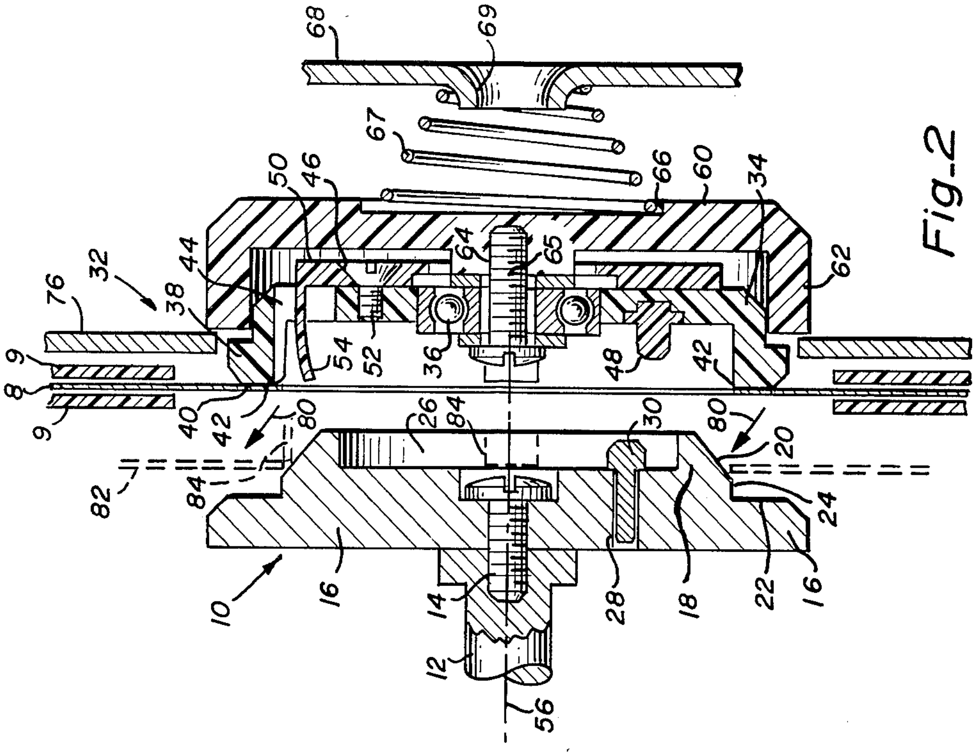
FIG. 2 is a cross-sectional view taken along the line 2-3-2-3 of FIG. 1 schematically illustrating the positioning of the operative components of the present invention in the cartridge loading position.
Figure 3:
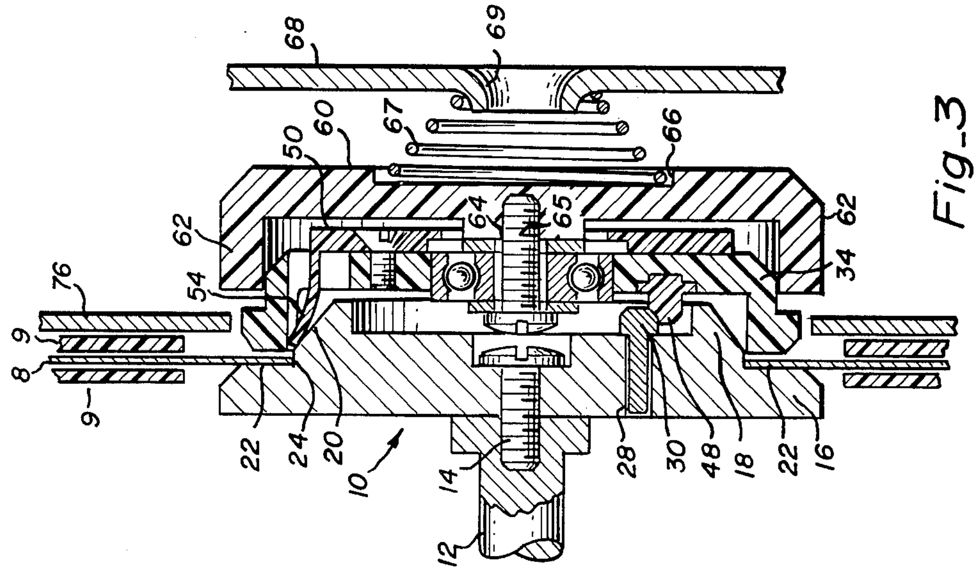
FIG. 3 is a cross-sectional view taken along the lines 2-3-2-3 of FIG. 1 schematically illustrating the positioning of the operative components of the present invention in the cartridge clamping position.

Referring also to FIGS. 2 and 3, the mechanism is illustrated in cross-sectional views in the cartridge loading and the cartridge clamping positions, respectively. As shown, the mechanism includes the spindle 10 which is mounted on shaft 12 for rotation therewith about an axis 56 by a screw 14. The spindle 10 includes a generally cylindrical base portion 16 and a disc receiving portion 18, that is in the shape of a generally truncated cone, that are integrally formed. The side surfaces of the cone define a camming surface, generally designated by the numeral 20. The face of the base portion 16 defines a clamping surface 22, and a surface of the cone normal to the clamping surface 22 which interconnects the clamping surface and the camming surface 20 is cylindrical in shape and defines a circular registration surface 24. The interior of the spindle 10 is recessed as at 26 to provide clearance for the clamp assembly as will be subsequently described. Disposed through the spindle 10 is an aperture 28. Mounted within the aperture 28 is a drive pin 39, the head of which is tapered, or chamfered, and protrudes into the recess 26. Preferably, the spindle 10 and the drive pin 30 are comprised of stainless steel material with the surfaces 20, 22 and 24 being precisely machined.

A clamp assembly, generally designated by the numeral 32, includes a hub clamp 34 which is generally annular in shape and which includes a ball bearing assembly 36 carried within its central opening. The ball bearing assembly 36 allows the hub clamp 34 to be freely rotatable about the axis 56 when it is engaged with and driven by the spindle 10. Depending outwardly from the outer extremities of the hub clamp toward the spindle is a lip 38. The lip 38 is formed to provide a smooth clamping surface 40 and a registration engaging surface 42. The registration engaging surface 42 is cylindrical in shape and has a diameter slightly greater than the diameter of the registration surface 24. Disposed through the base of hub clamp are four holes 44, which are equally spaced from one another. Radially inwardly of the holes 44 are a pair of threaded apertures 46. Protruding outwardly from the base of the hub clamp toward the spindle between the inner periphery and the lip 38 is a hub pin 48, the head of which is tapered, or chamfered. The hub pin is preferably an integral part of the hub clamp but alternatively may be secured to the base as by bonding or staking. The radial location of the hub pin 48 is such that when the clamp assembly 32 approaches the cartridge clamping position (see FIG. 3) the tapered head of the hub pin 48 engages the tapered head of the drive pin 30 with an interference fit. Alternatively, several hub pins (not shown) may be secured to the base equally spaced from one another at the same radius as the hub pin 48 such that engagement is provided within less than a spindle revolution. A thin annular ring 50 is secured to the hub clamp 34 by screws 52 which are secured within the apertures 46. Extending inwardly from the outer periphery of the ring 50 are four flexible fingers 54 which are positioned for insertion through the holes 44 in the hub clamp 34. The ring 50 and the fingers 54 are integrally formed from a flexible material, such as delrin, with the distal end of the fingers 54 being normally biased radially inwardly as illustrated in FIG. 2, toward the axis 56 through the spindle and the clamping assembly.

A lifter 60, which is circularly shaped includes an outer annular portion 62 which has a diameter slightly greater than the outer diameter of the hub clamp 34. A central opening 64 is disposed through the center of the lifter 60 for receiving a screw 65 which serves to secure the hub clamp 34, the ballbearing assembly 36, the ring 50 and the lifter 60 together. The rear face of the lifter 60 is notched as at 66 to receive one end of a compression spring 67. A bridge plate 68, associated with the cover of the flexible disc drive includes a raised portion 69 for receiving the other end of the spring 67. A cartridge guide 76, which also comprises a portion of the flexible disc drive, serves to guide the disc 8 into position on the spindle 10.

As previously mentioned, the mechanism is illustrated in the cartridge loading or open position in FIG. 2. As shown, the disc 8 is illustrated as being misaligned in that it is eccentrically positioned with respect to the axis 56. Accordingly, the inner periphery of the disc extends below the position of the top finger 54. In addition, the cartridge guide 76 abuts the surface of the annular portion 62 of the lifter 62. Operation of the present invention will be disclosed by way of examply using FIGS. 2 and 3. As previously stated, the primary objective of the illustrated apparatus is to accurately clamp the flexible disc 8 to the spindle 10 and to provide a positive drive between the spindle and the clamp assembly. When the door of the flexible disc drive is opened, the disc is positioned between the cartridge guide and the spindle as shown in FIG. 2. Since the bridge plate 68 is coupled to the cartridge guide 76 as the door of the disc drive is closed, the bridge plate 68 and the cartridge guide 76 are moved towards the spindle 10. Corresponding to the movement of the bridge plate, the clamping surface 40 of the hub clamp 34 and the ends of fingers 54 engage the disc and causes the disc to be moved against the camming surface 20 of the spindle. This intermediate position of the disc against the camming surface is illustrated by the dashed line and designated by the numerals 82 in FIG. 2. With the disc in this intermediate position, the fingers, illustrated in dashed lines by the numeral 84, because of their inward bias, are in contact with the camming surface 20. Continued axial movement forces the contacting fingers to flex outwardly. Since the spindle is normally driven at a constant angular velocity and since the hub assembly is free to rotate, the frictional force between the fingers and the spindle is sufficient to impart rotation to the hub clamp. Since it is assumed that the disc is not centered about the axis of the spindle, one or more of the fingers 54 contact the inner periphery of the disc and urge that portion along the camming surface in the direction of the arrows 80, thereby serving to center the disc on the spindle.

With reference to FIG. 3, the mechanism is illustrated in the cartridge loaded, or closed, position. In this loaded position, the disc is centered on the spindle with its inner periphery in contact with the registration surface 24 of the spindle and with its inner face tightly secured between the clamping surfaces 22 and 40 of the spindle and the hub clamp, respectively. It should be further noted that in this position, the registration-engaging surface 42 of the hub clamp 34 abuts the registration surface 24. The above relationship is maintained by the compression force of spring 67. With the disc clamped in this manner, the tapered head of the drive pin (or pins) 30 engages the tapered head of the hub pin (or pins) 48 due to their slightly offset radial locations.

It should be recognized that since the hub clamp is driven by the spindle prior to clamping, disc damage due to scuffing is minimized. Upon clamping the interfacing engagement of the drive pin 30 and the hub pin 48 positively transmits the rotation of the spindle to the hub clamp 34. Consequently, the spindle and the hub clamp are caused to rotate with the same angular velocity about the axis 56, thus increasing the driving torque applied to the disk.

The cartridge will remain in the loaded record/-playback position until the door is opened, which causes the bridge plate to be moved away from the spindle. When this occurs, the cartridge guide 76 is moved against the lifter 60, the spring 67 is compressed, thereby removing the clamping force against the disc, and the clamp assembly 32 is removed from engagement with the spindle 10.

Figure 4:
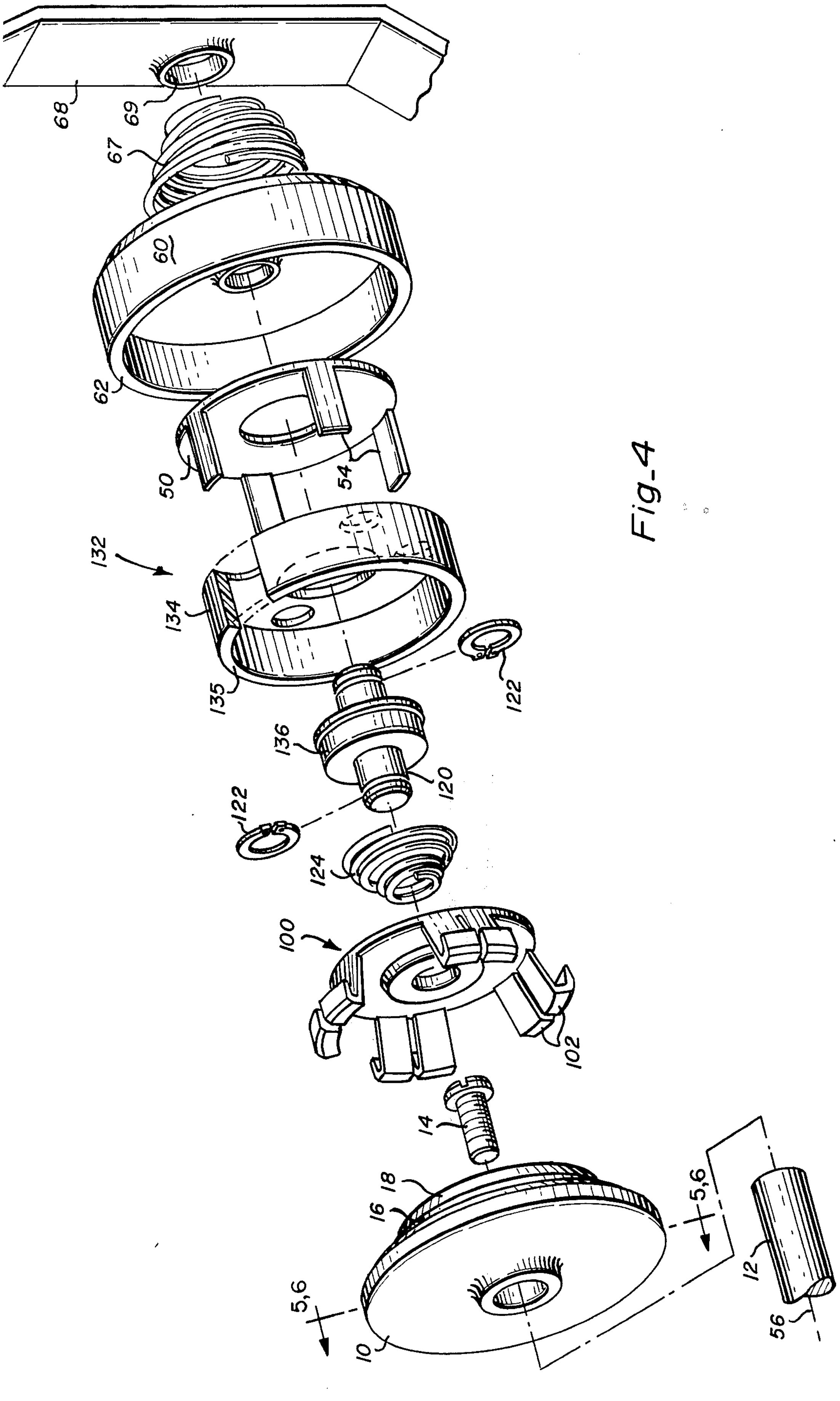
FIG. 4 is an exploded perspective view of the apparatus in accordance with a second embodiment of the present invention.
Figure 5:
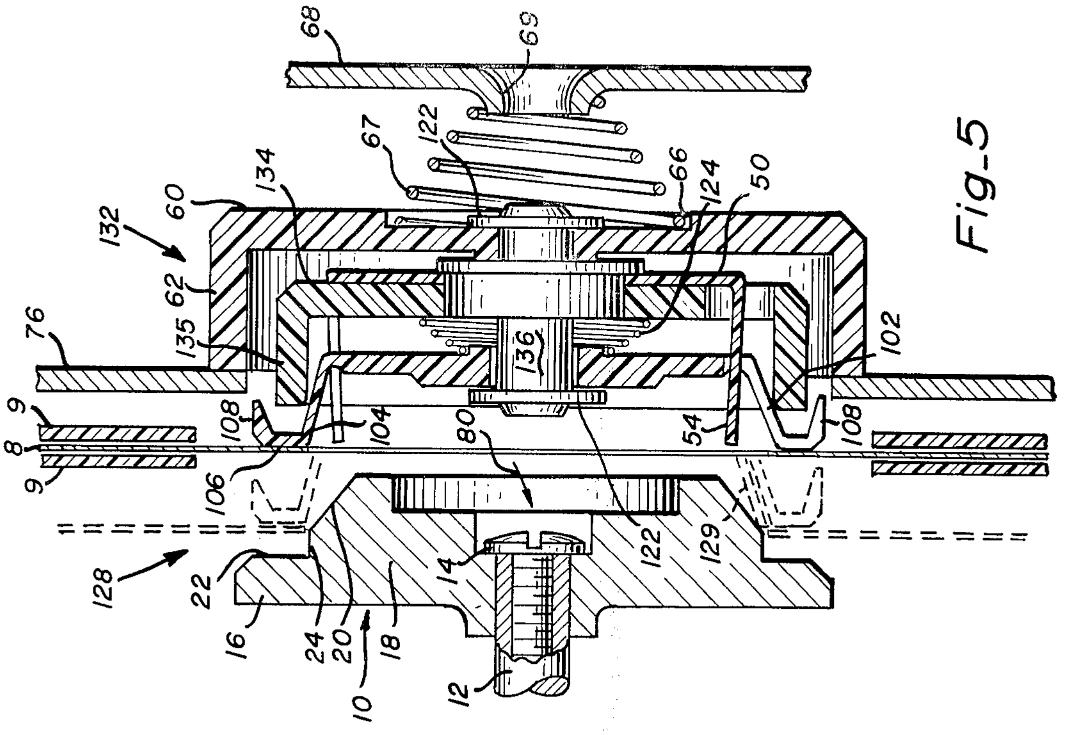
FIG. 5 is a cross-sectional view taken along the line 5-6-5-6 of FIG. 4 schematically illustrating the positioning of the operative components of the present invention in the cartridge loading position.
Figure 6:
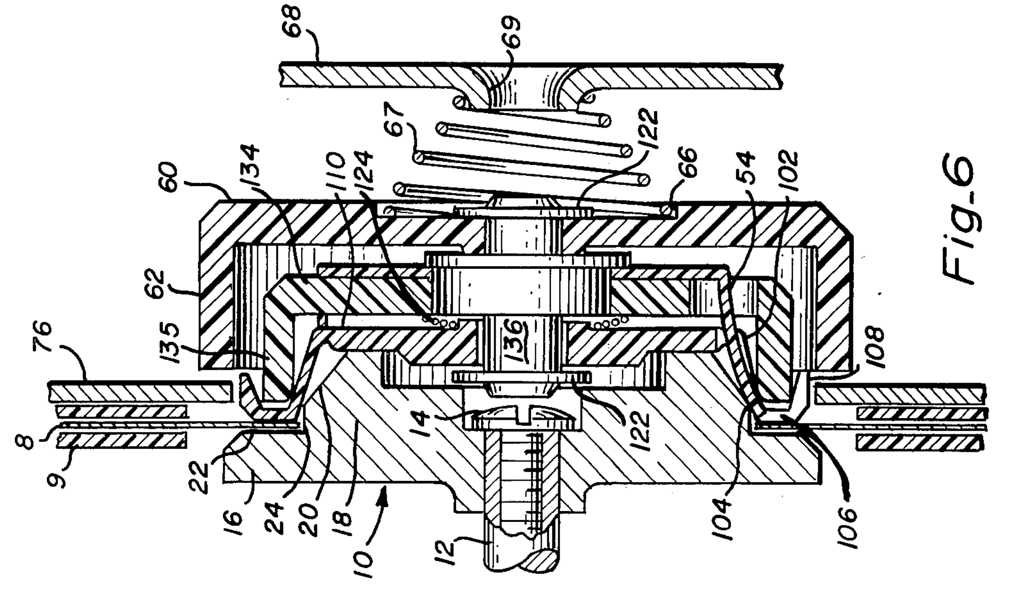
FIG. 6 is a cross-sectional view taken along the line 5-6-5-6 schematically illustrating the positioning of the operative components of the present invention in the cartridge clamping position.

Referring now to FIGS. 4–6, a second embodiment of the present invention is illustrated. The fundamental difference between the embodiment of FIGS. 4–6 and the embodiment of FIGS. 1–3 is that the hub clamp has been modified so as to further comprise a flexible collet 100 which serves to clamp the disc against the spindle and also to clamp the clamping assembly to the spindle. In this embodiment, many of the parts are identical with those illustrated in FIGS. 1–3. Accordingly, identical parts have been designated by the same numerals given them in the previous description.

The spindle 10 is similar to that described above, but does not have a drive pin inserted therethrough. A clamp assembly 132 includes the collet 100, a hub clamp 134, a ballbearing assembly 136, a flexible ring 50, and a lifter 60.

The collet 100 is annularly shaped and has eight clamping fingers 102 depending from its outer periphery toward the spindle 10. The fingers 102 are arcuate in plan view and generally L-shaped in cross-section and are formed in groups of two such that a radius from the center of the collet between adjacent pairs of clamping fingers are separated by substantially 90 degrees. Each of the clamping fingers subtends an angle of about 30 degrees and includes a hub clamping portion 104 disposed along the leg of the L which defines a hub clamping surface, a portion 106 disposed along the base of the L, which defines a disc clamping surface, and a hub retaining portion 108 which extends from the distal end of the disc clamping surface 106 toward the base of the collet which serves to receive the hub clamp 134. At the intersection at the base of the collet and the clamping fingers 102, a hinge point is formed as at 110. The leg of the L forms an angle of about 15 degrees relative to the axis 56 through the center of the collet. Preferably, the collet is formed from a flexible material such as Valox 310 SEO.

The hub clamp 134 is annular in shape and includes around its outer periphery a lip 135. As in the first embodiment, four equally spaced holes are disposed through the base of the hub clamp for receiving respective fingers 54 of the ring 50. A pin 120 extends through the interior of the lifter 60, the ring 54, the hub clamp 134 and the collet 100 so as to form the clamp assembly 132. The ball bearing assembly 136 allows the hub clamp, ring and collet to rotate with the spindle about the axis 56. Snap rings 122 secure the assembly together. In addition, an inner spring 124 is disposed around the pin 122 between the collet and the hub clamp for biasing the elements apart.

In this embodiment, the mechanism is illustrated in the cartridge loading position in cross-section in FIG. 5. In operation, when the door of the flexible disc drive is opened the disc clamping surface 106 of the collet abuts the face of the disc 8. As the door of the disc drive is closed, the bridge plate 68 and the cartridge guide 76 are moved towards the spindle 10. Corresponding to the movement of the bridge plate, the hub clamp is moved axially such that the hub clamping surface 104 urges the disc onto the conical portion of the spindle and against the camming surface 20. This position is illustrated in FIG. 5 by the dashed lines and is designated by the numerals 128. As in the previous embodiment with the disc in this position, the fingers 154 are in contact with the camming surface 20. Continued axial movement associated with closing the door forces the contacting fingers 54 to flex outwardly as illustrated by the numerals 129. As in the first embodiment, since the spindle is normally driven at a constant angular velocity and since the hub assembly is free to rotate, the frictional force between the fingers and the spindle is sufficient to impart rotation to the hub clamp. Accordingly, one or more of the fingers contacts the inner periphery of the disc and urges that portion along the camming surface in the direction of the arrows 80, thereby serving to center the disc on the spindle.

As shown in FIG. 6, the mechanism is in the cartridge loaded position. In this position, the disc is centered on the spindle with its inner periphery in contact with the registration surface 24 of the spindle and with its inner face tightly secured between the clamping surfaces 22 and 106 of the spindle and the collet, respectively. In this position, the lip 135 of the hub clamp 134 is continuously urged into the clamping fingers 102 between the portions 104, 106 and 108 thereof by the spring 67 causing the clamping fingers to squeeze inwardly against the spindle registration surface 24. Accordingly, the hub clamping surface 104 is clamped against the registration surface 24 of the spindle, thereby forming a positive coupling therebetween. It should be noted that the fingers 54 are positioned between the respective clamping fingers 102 so as not to interfere with clamping.

In operation, spindle rotation is coupled through the spindle registration surface 24 to the corresponding hub clamping surface 104 of the collet and consequently to the hub clamp. Consequently, the spindle and clamp assembly are caused to rotate with the same angular velocity, thereby increasing the torque applied to the disc as previously described.

Preferably, the hub clamp and the ring are formed from a plastic material. Although shown as separate elements, it should be realized that the two may be integrally formed. The compression spring is preferably fabricated with music wire as is the inner spring of the second embodiment.

From the above, it will be seen that there has been provided a mechanism for clamping and driving a flexible disc which fulfills all of the objects and advantages set forth above.

While there has been described what is at present considered to be the preferred embodiments of the invention, it will be understood that various modifications may be made therein, and it is intended to cover in the appended claims all such modifications as fall within the true spirit and scope of the invention.

What is claimed is:

1. A mechanism for clamping and driving a flexible disc comprising:

a rotatable spindle formed to include a camming surface, a first disc clamping surface, and a disc registration surface, said spindle being rotatable about an axis; and clamping means including a second disc clamping surface and a registration engaging surface, said clamping means being rotatable about said axis and movable along said axis from a disc loading position to a disc clamping position and further including means responsive to spindle rotation and operative to positively transmit said spindle rotation to said clamping means, said clamping means additionally including guide means responsive to misalignment of the inner periphery of said disc relative to said axis when said disc is loaded between said spindle and said clamping means and operative to engage a portion of said inner periphery that contacts said camming surface as said clamping means moves from said disc loading position into a position intermediate said loading and said clamping positions, said guide means serving to cam said inner periphery along said camming surface and into registration with said disc registration surface, whereby when said clamping means is in said clamping position, said disc is clamped between said first and second clamping surfaces and said means responsive to spindle rotation is positively registered with said spindle such that rotation of said spindle is positively transmitted to said clamping means.

2. A mechanism for clamping and driving a flexible disc as recited in claim 1 wherein said guide means comprises a plurality of flexible fingers, said fingers serving to engage said inner periphery, and to flex radially outwardly so as to cam said inner periphery along said camming surface and into registration with said disc registration surface as said clamping means moves from said intermediate position to said clamping position.

3. A mechanism for clamping and driving a flexible disc as recited in claim 2 wherein said guide means includes four fingers which are equally spaced apart.

4. A mechanism for clamping and driving a flexible disc as recited in claim 1 wherein said spindle includes a drive pin and wherein said means responsive to spindle rotation includes a hub pin disposed for engagement with said drive pin, whereby rotation of said spindle causes said drive pin to engage said hub pin, thereby to positively transmit spindle rotation to said clamping means.

5. A mechanism for clamping and driving a flexible disc as recited in claim 4 wherein said drive pin and said hub pin include respective head portions which are tapered to enhance engagement.

6. A mechanism for clamping and driving a flexible disc as recited in claim 2 wherein said clamping means comprises a hub clamp which includes said second disc clamping surface and said registration surface, and second disc clamping surface being generally annular in shape to clamp the surface of said disc near said inner periphery thereof, said hub clamp further including a plurality of apertures for receiving said fingers therethrough.

7. A mechanism for clamping and driving a flexible disc as recited in claim 2 wherein said disc is positioned along a disc guide, said mechanism further including a lifter secured to said clamping means which abuts said disc guide when said clamping means is in said loading position and means for biasing said lifter toward said clamping means.

8. A mechanism for clamping and driving a flexible disc as recited in claim 2, said clamping means including a collet which includes a plurality of flexible members, said members formed to comprise said second clamping surface and said registration engaging surface, said fingers extending between said members.

9. A mechanism for clamping and driving a flexible disc as recited in claim 8, said clamping means including a hub clamp which is disposed for engagement with said second clamping surface and said registration engaging surface, said hub clamp maintaining said disc clamped between said first and second clamping surfaces and said registration engaging surface against said disc registration surface when said clamping means is in said clamping position, thereby to positively transmit spindle rotation to said clamping means.

10. A mechanism for clamping and driving a flexible disc as recited in claim 9 and further including spring means disposed between said hub clamp and said collet for urging those elements apart.

* * * * *